US011910060B2

(12) United States Patent
Bolivar et al.

(10) Patent No.: US 11,910,060 B2
(45) Date of Patent: Feb. 20, 2024

(54) SYSTEM AND METHOD FOR AUTOMATIC DETECTION OF PERIODS OF HEIGHTENED AUDIENCE INTEREST IN BROADCAST ELECTRONIC MEDIA

(71) Applicant: Caspian Hill Group, LLC, Pottstown, PA (US)

(72) Inventors: Amy Bolivar, Boyertown, PA (US); Steven Lubin, Yardley, PA (US); Audrey Faust, Pottstown, PA (US)

(73) Assignee: Caspian Hill Group, LLC, Pottstown, PA (US)

( * ) Notice: Subject to any disclaimer, the term of this patent is extended or adjusted under 35 U.S.C. 154(b) by 0 days.

(21) Appl. No.: 17/320,525

(22) Filed: May 14, 2021

(65) Prior Publication Data

US 2022/0182722 A1  Jun. 9, 2022

Related U.S. Application Data

(60) Provisional application No. 63/122,064, filed on Dec. 7, 2020.

(51) Int. Cl.
H04N 21/466  (2011.01)

(52) U.S. Cl.
CPC ................................ H04N 21/4667 (2013.01)

(58) Field of Classification Search
CPC .................... H04N 21/25875; H04N 21/4667
USPC ................................................ 725/14, 34, 51
See application file for complete search history.

(56) References Cited

U.S. PATENT DOCUMENTS

| 2003/0033347 | A1* | 2/2003 | Bolle | G06F 16/786 |
| | | | | 707/E17.022 |
| 2013/0183022 | A1* | 7/2013 | Suzuki | G06F 16/7844 |
| | | | | 386/241 |
| 2014/0164507 | A1* | 6/2014 | Tesch | H04L 51/10 |
| | | | | 709/204 |
| 2015/0220537 | A1* | 8/2015 | Cosgrove | G06F 16/438 |
| | | | | 707/738 |
| 2019/0289372 | A1* | 9/2019 | Merler | G06N 3/08 |

* cited by examiner

Primary Examiner — Yassin Alata
(74) Attorney, Agent, or Firm — Ted Sabety; Sabety +associates, PLLC

(57) ABSTRACT

This relates to using a computer simulation to test another computer program in real time or simulated real time that is sped up. The disclosed method and system synchronizes information input into the simulation so that the program under test operates in an independent way. The method and system operates a protocol to connect one running computer process, a trading computer program, with another running process, a computer program that executes a market simulation in order to optimize the quality and speed of the simulation and testing of the external computer program.

36 Claims, 4 Drawing Sheets

SYSTEM AND METHOD FOR AUTOMATIC DETECTION OF PERIODS OF HEIGHTENED AUDIENCE INTEREST IN BROADCAST ELECTRONIC MEDIA

PRIORITY CLAIM

This is a utility application, which claims the benefit of U.S. Provisional Patent Application No. 63/122,064, filed on Dec. 7, 2020 which is hereby incorporated by reference in its entirety for all that it teaches herein.

FIELD OF INVENTION

This invention relates to using a computer system that uses advanced signal processing and data analysis processes to automatically monitor broadcast electronic content to detect periods of time where the content exhibits characteristics indicating heightened emotion or attention interest by a live audience or commentators. To pinpoint areas of interest within an audio or video stream or file (content) that would be of most interest to a person by analyzing the audio and video for behavioral and scene changes where scene is defined by the analysis of physical people, emotion, mood, tone and patterns found within each piece of content.

BACKGROUND

There are many sources of broadcast audiovisual content. In some cases, it is live television broadcast. In other cases, it is live streamed content that is distributed by means of the Internet. In the media industry, there is a need for clips that summarize or present highlights of earlier broadcast content where the clips are the most interesting parts of the prior broadcast program. One example is highlight reels from a broadcast football game. In order to create a highlight reel, the broadcast signal has to be recorded. Then, an editor has to view the entire recorded program and take note of start and stop times of candidate clips for the reel. Then the editor has to perform the edits to extract the clips from the recording of the broadcast and assemble the reel. This is labor intensive and as a result, there are many broadcasts that do not have highlight reels created or even lists of times in the program where the most interesting parts of the broadcast may be found. This invention addresses this problem by means of computer processing of the broadcast program. The invention may operate on the broadcast program as it is being broadcast or operate on a recording of a program. The invention automatically identifies where in a program heightened interest may be inferred by analysis of the program itself. The output of the invention is a data structure listing start and stop times of one or more periods of time during the program. That data structure may be used as a source of information for other editors, or may be used by a computer program that automatically edits out the remaining time periods in order to create a highlight reel automatically. By "content", it is meant a stream of data or a stored data file that is comprised of data representing audio-visual content, for example, an MPEG-4 or AVI file. By "reel", it is meant a content file that is comprised of individual clips derived from a broadcast, whether live or recorded.

SUMMARY

The computer system embodying the invention relies on analyzing the data representing the audio, video, speech and all included meta-data comprising the content (example: closed-captions, embedded meta-data within streams and clips). The computer system executes a computer program that uses logic to look for patterns and changes to an emotional spectrum as content airs whether live, shifted or pre-recorded. The content is analyzed in real-time utilizing a blended approach of audio content recognition, video content recognition and machine learning to easily identify areas of interest within content. This identification can detect a piece of sub-content within the larger content by matching against a library. This identification can also identify unique parts of the content that repeats. This identification can also identify unique parts of content that don't repeat but by conducting signal analysis on the content, a scoring value can be determined that indicates a relative value to someone who may want to watch it. This invention relies on machine learning processes in order that it continually improve the accuracy of its scoring analysis process as more content is analyzed. In addition, the invention utilizes defined data models to determine an emotive state of the content. By utilizing machine learning, the invention will be continuously improved and at the same time faster at identifying the interesting areas content while also making the process more accurate.

An example of this approach would be that a pattern is found in a specific live sports industry such as football where the color and light changes dramatically following a touchdown and the accompanying audio exhibits a spectral characteristic that correlates with a heightened place on an emotional spectrum. The machine learning component can, after analyzing x number of games across x number of teams and leagues, obtain a set of parameters that drive its scoring calculation. In this example, the scoring is determined in a near real-time calculation for a series of predetermined time windows or slices of time. The invention may be used outside the field of sports by examining content that has actors, speech, music or other objects in the audiovisual stream that indicate period of heightened interest.

The video is analyzed looking at variances in luminosity, object and person scene changes. The facial emotions and body language is cataloged. The audio is analyzed looking at the crescendo of sound and creating a pattern around the graphing of this noise to determine points in the content where the emotive state is higher or lower. A scoring methodology is applied to all of the processes to incorporate rulesets that will help pinpoint interesting areas in programming in real-time. All of this blending of content provides the ability to cross-reference results and create the ability to provide predictive analysis on what areas of content would be most interesting to a person watching or listening to this content. There can be many areas of interest found within one piece of content. The crescendo and shifting of sound and variant changes between or within video frames including light, color, physical objects and patterns around this length of time create the ability to define a unique area within video or audio content that would predict what a person would be most interested in viewing or listening to. This is the goal of the application and its unique ability to focus on defining a predictive interesting area that a person would want to see or hear. It would be considered the most interesting areas within the content that could be replayed or viewed again.

The catalogue is comprised of a data structures stored in computer memory on on a mass storage device that lists the start and stop times, or start and stop frame numbers of each region of interest.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Figure 1:
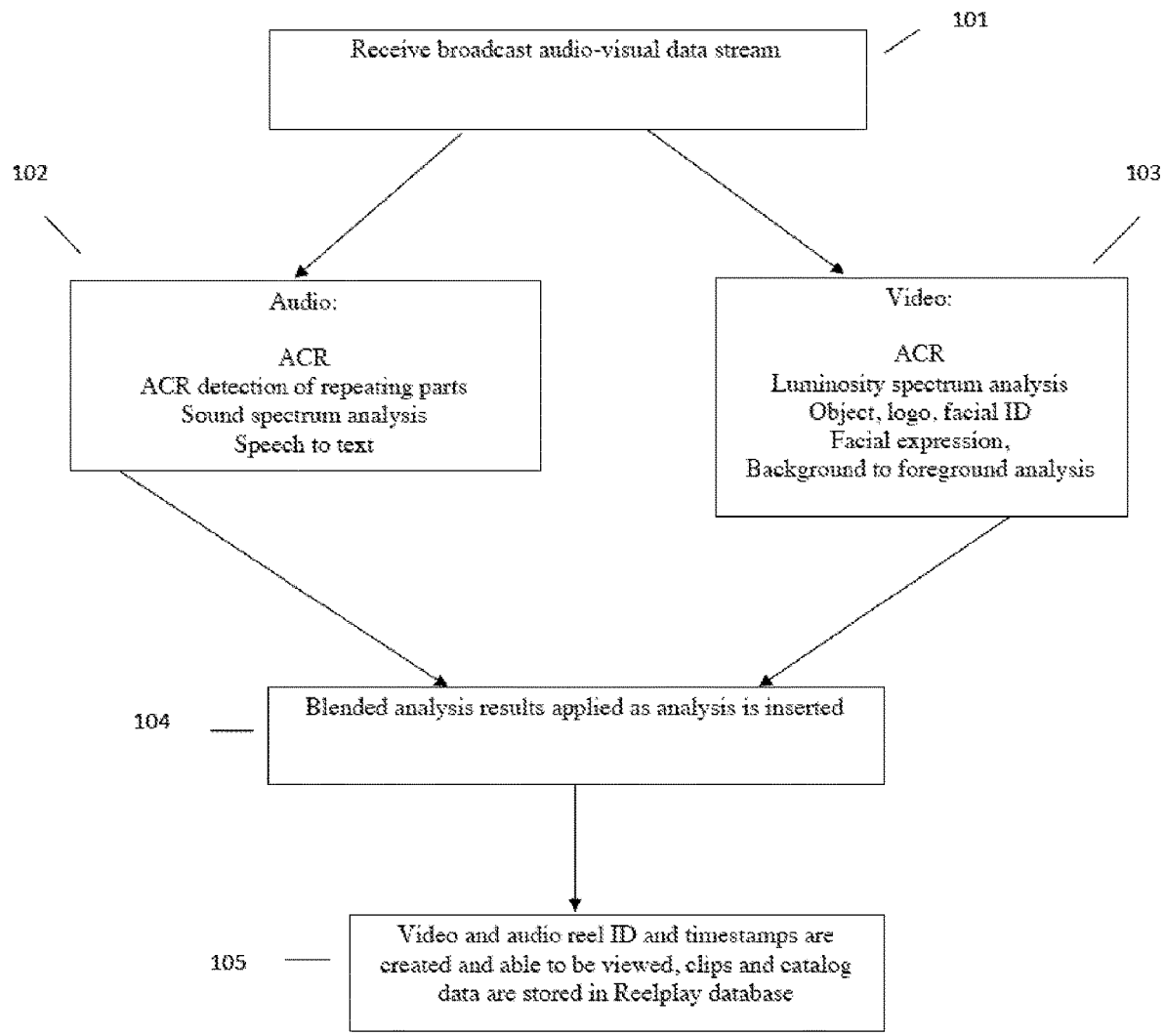
FIG. 1: An exemplary flowchart depicting the basic overview of the claimed invention
Figure 2:
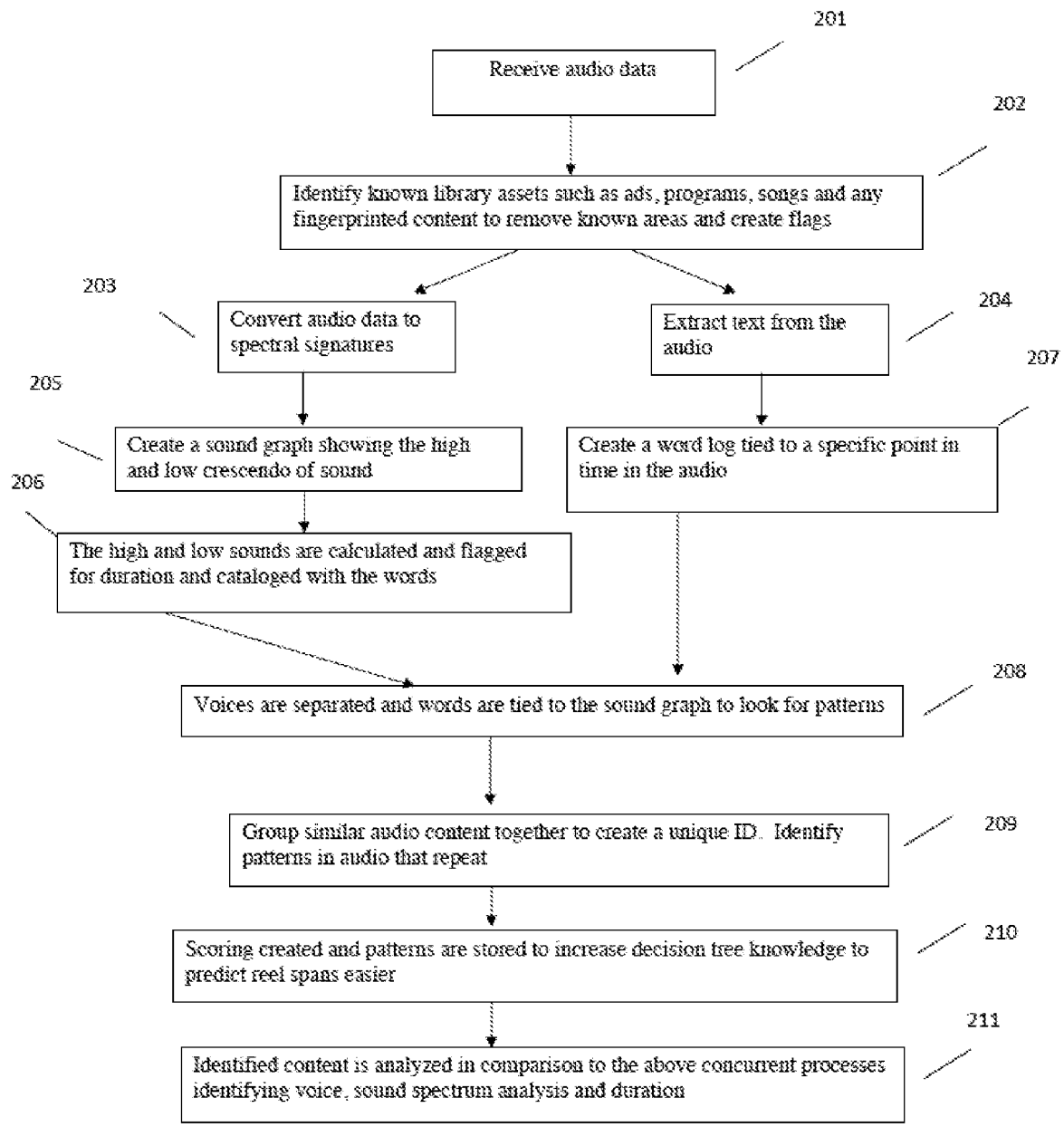
FIG. 2: An exemplary flowchart depicting the audio processing part of the claimed invention.
Figure 3:
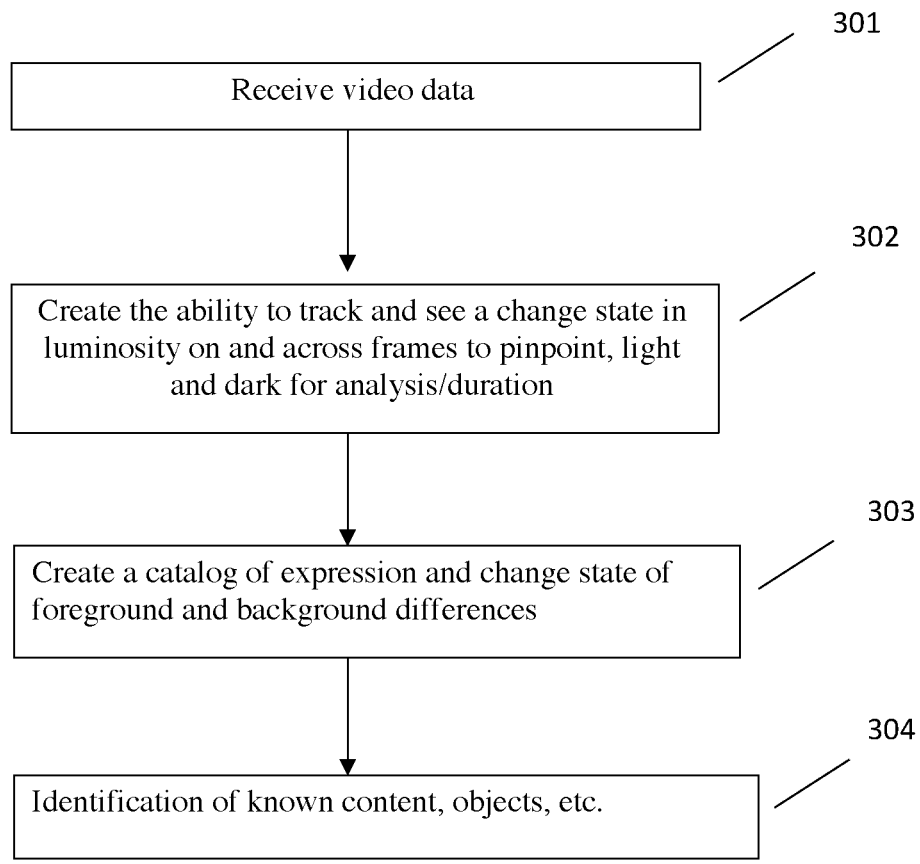
FIG. 3: An exemplary flowchart depicting the video processing part of the claimed invention.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

In one embodiment, the speech in the audio track comprising the content is analyzed by the computer system to determine the textual tone and mood of the content. This may be accomplished by the computer selecting a time slice of the audio that is in the time domain, and converting it to its corresponding frequency domain spectral values. This may be accomplished with a Fourier Transform calculation. As the slices are converted, a series of spectra values representing relative amounts of a frequency band in the audio may be concatenated together to form a data structure that represents a series of spectral shapes that vary over time. For example, each time slice n, can be represented in computer memory as a data structure using this organization:

Spectra(n, t)={Slice Time, Coeff 1, Coeff 2, Coeff 3 . . . Coeff m}.

In this example, Spectra (n, t) is the nth spectra vector, corresponding to time t in the broadcast or content file, where the vector is comprised of m coefficients that each correspond to a magnitude of a corresponding m predetermined audio frequency bands. As this data structure grows over time, patterns emerge in the spectra as a function time. In one embodiment of the invention, there is a predetermined spectra that indicates heightened interest. In the sports example, a score may illicit screams and yells in the crowd, which results in spectral qualities in the audio signal that were not there before. The system continually monitors the audio signal, converting it to a series of spectral vectors and then uses the machine learning analysis to determine if a condition consistent with heightened interest has been detected. One way is to compare a predetermined audio spectra vector to the audio spectra vector of a current time slice of the broadcast signal. If the two sufficiently match, then that slice can be flagged as being of interest. An a pseudo code example is provided:

```
For i = 1 to N; //N samples in the broadcast
{ SpectraVector (N) = FFT(SignalSlice(N));
If Match(SpectraVector(N), PredeterminedVector){
set SpectraVector(N).flag == 1;}
else SpectraVector(N).flag == 0;}
}
```

In this example the function "Match" may be one of a variety of numerical matching techniques. In one embodiment a Euclidean vector length may be calculated where each spectral vector element i is subtracted from the predetermined corresponding vector element i, to calculate the differences between each ith element. Then the length of the resulting difference vector may be calculated as a sum of squares of the differences. A length less than a predetermined threshold may then be determinative of a match.

In another embodiment, a machine learning engine (MLE) may be used to perform the Match function. The SpectraVectors may be a list of binary coded decimal numbers representing magnitudes of a frequency band in the signal. These binary numbers may be concatenated together to create one long vector that is input into the MLE as a string of binary digits. For example, with 8 bands of audio encoded into 8 bit FFT coefficients, the string of binary digits would be 64 bits long. This vector may then be input into the MLE engine. In this case, the MLE may be trained using a set of input SpectraVectors where the desired Match result is known, and then the desired output compared to the MLE output. Over time, the trained MLE receives the SpectraVectors and returns a flag value indicating whether that time slice is of interest.

The MLE neural network may be used to determine whether a spectral vector is correlated with heightened audience engagement or excitement. In this embodiment, a training set of known spectral vectors of both heightened and normal emotional state are input into the neural network. The output of the neural network is then compared to the known truth of whether the vector presented is or is not emotionally heightened. Any error in that result is used to back-propagate the error into the network so as to adjust the coefficients of the network to produce a correct result. As the body of known vectors increases, the relative accuracy of the neural network increases. The output of the neural network may be a Boolean value may feeds into the program logic as the output of the Boolean Match function indicated above.

The machine-learning engine is comprised of sub-modules that can be referred to as "neurons", although this doesn't literally refer to a biological neuron. The machine-learning neuron is typically an instance of a computer code module that exhibits characteristics like a neuron. For example, the output of a neuron can be a binary 1 or 0, determined whether the linear combination of the inputs to the neuron are equal to or greater than a threshold. In one embodiment, a neuron is represented by a set of computer code that when executed by the computer, causes it to calculate the linear combination of the neuron inputs, apply a thresholding function and then store an output value. Each neuron may be represented in one or more data structures as a set of input data, a set of coefficients and an output data value. The neuron program code itself may be called as a program sub-routine that is applied to each neuron data structure. The basic neuron calculation may be represented by this formula:

$$N=1 \text{ if } (\Sigma Input_i \cdot Coeff_i > T) \text{ or } 0 \text{ otherwise}$$

Where the i represents the ith input into the neuron. The index i ranges from zero to I, where I is the number of inputs into the neuron. In its most general form the function applied to the dot product is referred to as the activation function, which may take many forms. In some embodiments, the conditional in the expression may be replaced with a max function, such that the activation function is:

$$N=\max(\Sigma Input_i \cdot Coeff_i, 0)$$

Each neuron can be indexed, such that for a single layer array of J neurons, each represented by $N_j$ with j between 0 and J and each getting I inputs:

$$N_j = 1 \text{ if } \left(\sum_{i=0}^{I} Input_i \cdot Coeff_i > T\right) \text{ or } 0 \text{ otherwise.}$$

There can be layers of neurons, where the lowest layer of neurons get $Input_i$, but the higher layers get as input the output of the prior neuron layer. The higher jth layer may be represented by:

$$N_{i,j} = 1 \text{ if } \left(\sum_{i=0}^{I} N_{i,j-1} \cdot Coeff_{i,j} > T\right) \text{ or } 0 \text{ otherwise.}$$

The value I, where i=(0<i<I) represents the number of neurons per layer and J, where j=(0<j<J) is the number of layers.

Note that while this formalism appears to have each neuron of layer j−1 feeding its output to each next neuron layer j, if the $Coeff_{i,j}$ for that connection equals zero, it is as if there was no connection at all. In a preferred embodiment, the machine-learning components are comprised of one or more transformer models. The input of a spectral vector may be a string of numeric values by mapping each vector element to a lowest level $Input_i$. The input of an image into the lowest layer of neurons may be accomplished under this formalism by mapping each pixel to a lowest level $Input_i$. This may be by having each row of pixels in the image map to a different set of inputs in the lowest layer. For example, consider a 1028×1028 pixel image (low resolution, but as an example), the $1029^{th}$ input can represent the first pixel of the second row of the image. That is, for any pixel presented to $Input_i$, the $Input_{i+1028}$ is the pixel one row above the pixel presented to $Input_i$. To the extent the next level of neurons take as input lower level neurons corresponding to neighboring pixels in 2 dimensions, the values of the $Coeff_{i,j}$ will reflect the topology. For example $Coeff_{i,j}$ and $Coeff_{i,j+1028}$ would represent two weights at layer i for two pixels in the same column but neighboring rows in the image.

With the objective of obtaining an error of zeroes in all periods during the broadcast, a training algorithm may be applied that adjusts the coefficients $Coeff_{i,j}$ so that the next iteration produces a smaller or lower value error. This process is repeated until the system has reached an error that is at or below a predetermined sufficient error threshold. In one embodiment, the error vector may be converted to a single error parameter that is used as input to calculate the over all quality of the result and to make adjustments to the coefficients. In another embodiment, the difference between each output vector representing the error and attendant parameters to the input vector representing the input and attendant parameters, can be expressed as an error vector E where each of the i elements is used to adjust the coefficients of the neurons upon which output vector element i is dependent. The objective is to have E to have all zeroes as elements.

In another embodiment, the relative error quality of vector E can be calculated as a Euclidian vector length of E: the longer the vector, the more error in the result. In this embodiment, the training process is repeated until the length of error vector E is less or equal to a predetermined parameter value representing the quality of the prediction. For multiple training predictions, where the entire training set is applied to the MLE, there will be a set of error vectors $E_{i,j}$ with i representing the ith element in the output vector and j the jth member of the training data set (that is, a pair of known input and output data). In this case, the objective is to adjust the coefficients in order that a predictive quality is achieved across the entire set of actual data. This may may represented as all of the E vectors being below some threshold length. Alternatively, it could be calculated as the vectors occupying a volume in j space (j dimensions) that is less than a predetermined data value representing the quality of the training.

In these arrangements of MLE architecture, the output of a given neuron in the network may be a function of both the neuron outputs of the layer below, but also combined with a set of outputs from a layer ahead. In a convolution architecture, the output of a given neuron may be a combination of the outputs of neurons on the next layer down, but selected such that the neurons represents a portion of the image surrounding a point in the image. In addition, at each layer i, there may be applied a set of coefficients or parameters representing a kernel of a convolution calculation that generates an calculation output for the next layer i+1. The kernel may be designed to detect a particular feature, or a data layer whose contents are the detection of the designated feature the kernel may filter for. The MLE may be comprised of multiple kernels. In the training process, the coefficients for the kernels may be adjusted to meet the error threshold requirement of the system.

More sophisticated neural network modelling may be used. For example, a recurrent neural network may be used, especially with regard to the audio analysis, so that the network can detect a series of changes or trends in the Spectral Vectors or the EmotionVectors as they are presented to the network time slice by time slice. In one example of the recurrent neural network architecture, the modelled neurons at layer L of the network may take as input both the output of the neurons at layer L−1 as well as the neurons at layer L+1. The data propagates through he neural network as it arrives, so that the data from layer L+1 arose from the signal data from time slice i−1. Similarly, at layer L, there may be inputs from layer L+2, L+3 and L+4. This type of neural network will cycle the feedback or recurrent path once per time slice. This makes it possible for a neuron at layer L to be dependent on what has happened in the four prior times slices. The example explains the processing with a 4 time slice look back. However, each time slice may be approximately the period of a video frame, so as short as $\frac{1}{30}^{th}$ of a second. Therefore, if one assumes a sonic crescendo into an event taking as long a 5 seconds, the actual look back may be as many as 150 times slices. In this type of recurrant neural network, this means that there may be as many as 150 layers of neurons.

However, another form of recurrent neural network may have fewer layers while still performing trend analysis. This example has layer L output N bit neuron outputs representing a binary value representing the strength of a trend of increase in excitement, decrease or neutral. This vector of N bits feeds back into the input of layer L for the next clock cycle. In the next clock cycle, the output of layer L-1 in combination with the current vector N creates a new vector N for the next clock cycle. The coefficients of the neurons in layer L are adjusted so if the layer L-1 detects a continued trend in the same direction as old vector N, then new vector N has its magnitude increased, while if the direction changes, then vector N's magnitude is decreased. The cyclical nature of this arrangement makes it possible that fewer than 150 neural layers may be used to analyze a trend that may be 150 time slices long.

At the same time as the audio spectra are being analyzed, the audio signal is used in a text extraction algorithm to determine what words are being spoken, typically by the commentators. Returning the sports example, the score is made, the crowd is yelling and screaming, and in addition, the commentators may be speaking words to express exclamation or amazement at the athletic feat. Both of these elements will be in the audio data stream. In this part of the process, the system submits the audio signal to a text extraction system or service that then delivers a stream of text data, typically a stream of ASCII data. Alternatively, for a recorded broadcast, the result can be a data file comprised of text data.

In one embodiment, the text data is the output of a transcription service or function that indicates for a given broadcast program which words are being used by which on-air personalities. In this embodiment the database of predetermined word sets and phrases indicating heightened emotion or attention may have as an additional data element in the data set the name of the on-air personality or personalities that use that word or phrase. In this way, the system can utilize a specific predetermined word set corresponding to the on-air personality that uttered the word being analyzed. Select word set corresponding to the identity of the speaker in the text output. A particular persona may have a set of words they always use then use that when you know who is in the broadcast, that is, there is data input representing the identity of at least one of the speakers in the audio stream. That information may be found in the TV Guide™ Electronic Program Guide (EPG), which the EPG delivers as metadata, or any OTT services have this information, or extracted from text credits displayed before or after the actual broadcast. In yet another embodiment, if the audiovisual content is comprised of metadata, the metadata itself may be used to select a word set. For example, the text use in hashtags for video distributed through social media may be utilized to select rules to apply to analyzing the audio-visual content.

Each word identified in the text data is associated with a time slice value or frame number. In one embodiment, the text data is delivered as a two column table, the second column being one or a set of detected words and the first column the time value or frame number when the word was detected. This data may be stored as a data structure or a data file on a mass storage device. The system also retains a stored pre-determined set of words that are correlated with excitement or attention. The system may utilize a database of predetermined words and phrases and terms associated with or correlated to heightened emotion (e.g. "Oh Wow", "Amazing", "Did you see that?") The table data structure may have a third column that contains a Boolean value indicating whether that word is flagged as being correlated with excitement, heightened emotion or attention. By running a text matching process on the table using the pre-determined word set, each entry in the third column, indicating a heightened emotional or interest state may be determined and stored. An example table data structure is provided below:

WordSet={Wow, Amazing, "Look at that", "Lets turn to the video tape"}

| Time Slice No. | WordSet Element | Flag |
|---|---|---|
| 1035 | Amazing | 1 |
| 1078 | Wow | 1 |
| 2035 | "lets turn to the video tape" | 1 |

The following pseudo-code explains the process:

For i = 1 to N; //N the number of time slice values. A detected word is associated with at least one
time slice.//{ If (word(i).text == AnyOf(WordSet)){
   Word(i).flag == 1;}
Else: Word(i).flag == 0;
}

As with the audio sprectra analysis, the AnyOf function, which essentially determines if the words being used indicate a heightened emotional state or heightened attention, may be replaced with an MLE function. In this embodiment, the MLE receives an input vector i that is an encoding of the word(i). In this example, the Wordset may be predetermined, or it may selected for each broadcast base don the known type of content of the broadcast or even the identity of the commentators on the broadcast. In this example, if a commentator is known for a trademarked exclamation (e.g. "Let's turn to the video-tape"™, by the legendary Werner Wolf), then these words or the phrase would be selected to be part of the WordSet as a result of determining that the broadcast is a sports broadcast with Werner Wolf as a commentator. When used with an MLE, the selected WordSet is an additional set of vector elements that are input into the base level of the MLE architecture.

While both the audio spectral analysis and the word detection analysis are running, the system can then determine if there are periods of time where both detect heightened emotional levels at the same time. The system uses the two data process results as input to a correlating calculation that determines for each time slice or a series of time slices, whether there is the logical condition that the audio samples are flagged as heightened emotion and at substantially time, the detected words are flagged as correlated with heightened emotion was well. In one embodiment, this is accomplished by simply determining which time periods have the audio spectra flag and the word detection flag equal to one, that is indicating a heightened state of attention. This period of time is then likely to be worth clipping and using in a reel.

In an alternative embodiment, the "flag" variable, which has been explained using a Boolean value, may be replace with a integer or floating point number indicating a relative matching score. This approach provides a more flexible way to avoid errors arising from thresholding type logical tests. In this embodiment, the Match or AnyOf functions output a relative value representing a score. In the case of Match, the spectral characteristics may exhibit some but not all of the analytical features of a fully heightened emotional state. Likewise, the AnyOf score may be higher if all of the words in the set or identified as compared to a few of them. In this embodiment, the system stores the score value instead of a Boolean flag value. The data record associated with the tine slice may also be comprised of the Match score and the AnyOf score. The correlation calculation can then be more fine tuned than a logical conjunction of two Boolean flag values. In this embodiment, the scores may be combined together. In the simplest way, the two scores may be added together. In another example, a linear combination of the two scores may be calculated where two pre-determined coefficients are used that have been empirically adjusted to provide an optimal result. This alleviates the inaccuracy of a loud audience reaction combined with a muted commentator reaction. Instead these anomalous conditions may still be calculated to score high enough to be considered a period of heightened emotion or attention.

The system may also use the video signal as an input into the analysis. In this embodiment, the MLE may be used to analyze the sequence of video frames in the signal. In this embodiment, the audio sample numbers or time slices may be mapped to the video frames they belong to. In one embodiment, the audio spectral analysis is performed such that the mapping is one to one: the audio spectrum is analyzed on a video frame by video frame basis. The time slices are one video frame long.

In one example, the convolution neural network may be used to detect facial expressions by using one or more kernels that detect heightened emotions in faces. For each detected face the system may create a data object that has a corresponding variable representing the types of typical emotive facial expressions, e.g. raised eyebrow, jaw drop, yelling, smile, laugh, pushing face forward. Similarly, facial recognition may be used to identify commentators that appear in the video stream. The one or more kernels used in the convolution may be comprised of data representing one or more image elements that encode these visual aspects. Other aspects of the video stream can also be detected automatically. These can include luminosity of the signal that indicates scene changes or quick changes in camera angle. These may be detected and catalogued as data objects with a corresponding value and time slice. As such, these values may be a third data stream of vector elements input into the MLE for the automatic detection or scoring of analysis of the audiovisual signal to determine whether time slices are in periods of heightened emotional state or audience attention.

And additional data element may be used to determine if a particular broadcast has a period of heightened emotional state or audience interest. In some cases, live presentation re-play prior parts of the audio-visual stream. For example, in a sports broadcast, a particular play or portion of a play may be replayed several times. The system can include a component that executes a process of looking for self-similar parts of the video. This may be accomplished by considering each frame of the video as being mapped to a vector of length P, where P is the number of pixels. The video broadcast is then a set V of these vectors Pi in a sequence. The computer can use sorting and matching algorithms to determine if there is any two subsets of V where the elements of the subset are the same and in the same sequence, for example, given two subsets of V, V1 and V2, each of V1 and V2 of length N, where N is greater than a predetermined period of time, for example 5 seconds, or 150 frames at 30 frames per second, that algorithm detects the condition that:

For i=1 to N, V1, i=V2, i, where N>150.

If such a subset is detected, where the length of the N is greater than a predetermined value, for example, a number of frames representing 5 seconds (150 frames), then it is likely to be flagged as a re-play portion of the broadcast and therefore of heightened interest. The frame numbers or time slice indices of each fo the V1,i are then flagged as being of interest. Similarly, video ACR looks for scenes, and then if that scene gets replayed, then it is likely a component of heightened interest.

At this point, a data structure may be stored in the computer main memory or on the mass data storage device that represents the start and stop times (or start and stop frames) of detected heightened interest, an example depicted below:

| Start | Stop Frame | Video Score | Audio Score | Word Score | Interest Score |
|---|---|---|---|---|---|
| 0:0:15:25 | 0:0:30:21 | 2 | 8 | 6 | 16 |
| 0:1:32:01 | 0:1:40:25 | 8 | 3 | 8 | 19 |

In this example data structure, two period of heightened interest have been detected in a signal. In the first, it primarily derived a high score from audio spectral characteristics, and a little less so from the words the commentators were using. In the second, it may have been detected as a repeating sequence, which sent the video score up, and as a replay, the audio spectral content may have been subdued, but as a replay, the commentator's words indicate more interest. As a result, the interest score is also high. As further discussed below, additional columns in the data structure are possible that include additional information about the period in the broadcast signal.

Once the system has created a database containing records of portions of the signal that are of interest, the system can then automatically edit the audiovisual signal to create a highlight reel or sequence of video clips with the items of interest. This requires the step of mapping the start and end times of the detected period of heightened emotion or interest to appropriate start and stop times of the edit. This addresses the problem that often the audience excitement occurs after or towards the end of a motion or activity that results in that excitement. Returning the sports example, a desirable video clip would include the mundane snap and pass of a football as well as the exciting catch and run to the end zone, which is when the spectators gets excited. To accomplish this mapping, there may be a set of mapping rules that are selected depending on the context.

One rule may use the video luminosity to identify frames where the scene transitions or camera positioning has been changed. The rule would be that when an excited period is detected, the edit point would be time of the scene transition that was detected just prior to the start of the detected time period of excitement. Another rule may be that any repeating segment that is detected be edited so that the repeated segment is part of the output of video clips that are highlighted. In the absence of detecting scene changes, the rules might be to pre-roll the period of excitement by a predetermined period of time, depending on the type of content as indicated in the metadata. In another rule, there may be a sound that can be detected. In football, it would be the clatter sound of helmets slamming into each other at the line of scrimmage. Given the shot clock regulation in football, the start edit point would be 20 seconds before the detected clatter. In the case of tennis, it's the loud whack of a tennis serve. In that case, when detected in the sound, the edit point can be set to the shot clock period prior to detecting the sound of the serve.

Once the audio spectra and text has been analyzed, and the video analyzed, the time slices of interesting areas are flagged and a unique ID is created to be associated with a series of time slices or frames that typically are consecutive, which indicates a period of time in the program of heightened emotion or attention as indicated by the audio spectral analysis, text analysis and video analysis. In this example, a period of interest may be represented in a database as a data object having a ReelID, with attributes of a start time, a stop time, a start frame, and end frame, and any other metadata that has been extracted or associated with the clip.

X number of reels per content
Time flags for start and end of the reels
Unique identifier and description of the reels
Enhanced meta-data derived from the application when it finds a reel that will encompass:
speech to text analysis
actor/character scene description
defined sub-content such as inserted ads, songs, objects, logos
emotive, mood and tone graphing the audio to observe the spectrum, time in to change, differences in patterns
emotive, mood and tone of the video graphing motion and sound, changes in facial expression and body language, filming angles and adjustments and object/scene changes.
changes in luminosity
scoring methodology
descriptive meta-data about the content such as type of content, name of content The SpectralVector may be concatenated with other data to create a larger vector for the time slice that represents the emotional state of the broadcast program at time slice i. In this embodiment, for each time slice, a EmotionVector is extracted. This includes the audio SpectralVector elements and in addition, data values that may include luminosity, detected scene changes. In the same way as described for the SpectralVector, EmotionVector may be input into a neural network that is trained using a known set of EmotionVectors. The output of that neural network may be a Boolean value indicating that the time slice i that produced the EmotionVector i is of heightened interest. Alternatively, the neural network may output a vector representing a score indicating the level of heightened interest detected.

In yet another embodiment, and additional stream of data that can be used to detect heightened emotion may be by detecting the physical responses of a predetermined set of viewers who are watching the program. In this embodiment, each viewer may be subject to detection of physiological conditions in their body that indicate a heightened emotional state. The sensor device may be attached to or incorporate a computer that takes one or more sensor inputs, typically an analog signal, and then converts it to a stream of digital numbers representing periodic measurements of the physiological condition. On example of such a detected condition of the participating viewer's body is a skin galvanic response. Another is heart rate or respiratory rate or a combination of all three. This data stream may also be time stamped such that data messages containing the data may be transmitted from a residence to a central server that stores the body sensor data in a series of time slices that correspond to the time slices of the other data and the audio visual program itself. In one embodiment, all of the body sensor values within one time slice are averaged together. In another embodiment, the maximum or minimum value during that time slice is used. This aggregation of the data within the time slice for a given sensor may occur on the computer connected to the sensor prior to transmission to the central server, or, all of the data may be transmitted to the central server and the aggregation occur there. In other embodiments, the sensor data for the beginning or end of a time slice is used to represent the entire time slice. I In another embodiment, the participating viewer can freely select what program to watch and the computer tracks what those program selections are such that the body sensor data messages transmitted to the central server will also include at least one message that includes an identifier corresponding to the program that the viewer is watching. In addition, for many viewers participating in this detection, an identifier identifying the viewer may be included in the data sent to the central server. The received data is stored in a data structure that relates the detected sensor data to the time slices of the audio visual program. Similarly as to detecting the volume of an audience detected in the audio stream, heightened emotion can be determined by comparing one or more of the body sensor data to a predetermined threshold or predetermined data trend. As with the audio spectrum, this data can be vectorized and used as an additional set of vector elements input into the MLE. In one case, the body sensor vector elements may be concatenated to the audio spectrum, or both vectors input into the MLE. As with the other data streams, the periods of interest as indicated by the body sensor data can be tabulated with time slice intervals. This can then be an additional variable that are inputs into the correlation process to accurately determine periods of heightened interest or emotional state during the audio visual program.

In a preferred embodiment, the broadcast audio-visual data stream is received (101). The audio stream is comprised of ACR, ACR detection of repeating parts, sound spectrum analysis and speech to text (102). The video data stream is comprised of ACR, luminosity spectrum analysis, object, logo, facial ID, facial expression, background to foreground analysis (103). The blended analysis results are applied as the analysis is inserted (104) and then the video and audio reel ID and timestamps are created and able to be viewed, clips and catalog data are stored in the Reelplay database (105). The Reelplay database (105)

In a preferred embodiment, the repeating audio which is detected spectrum analysis or speech to text (201) identifies known library assets such as ads, programs, songs and any fingerprinted content to remove known areas and create flags (202) that can then be used to group similar audio content together, in order to create a unique ID. The unique ID is then used to identify patterns in the audio that repeat (203) which in turn creates a word log tied to a specific point in time in the audio (204). A word log is created which ties the words to a specific point in time in the audio (207). Simultaneously, a sound graph is created to show the high and low crescendo of the sound (203, 205). The high and low sounds are calculated and flagged for duration and cataloged with the words (206). At this point, the voices are separated and words are tied to the sound graph to look for patterns (208). Similar audio content is grouped together to create a unique ID, which helps to identify patterns in the audio that repeats (209). Scoring is created and patterns are stored to increase decision tree knowledge to predict reel spans more easily (210). The identified content is then analyzed in comparison to the above concurrent processes identifying voice, sound spectrum analysis and duration (211).

Then, the video data is received (301) which creates the ability to track and see a change state in luminosity on and across frames to pinpoint, light and dark for analysis/duration (302). Using this, a catalogue of expression and change state of foreground and differences is created (303) which aids in the identification of known content, objects and other data (304).

Some Defined Use Cases:

Live or canned sports to pull out the interesting plays in real or near-real time for companies and consumers to view for live sports and live event reels for real-time interaction and integrations for sports apps, sports betting and content display and integration Livestreams and user generated content to find trending reels to take advantage of areas of interest quickly that may have brand or advertiser mentions, athlete mentions, specific songs and keyword value to take advantage of as or before it becomes viral for predictive viral content identification and cataloging.

Long Form Video (example: Film/Movie catalogs) to pinpoint the areas of interest within these long form clips that would be most likely to be copied or distributed for predictive copyright protection.

Figure 4:
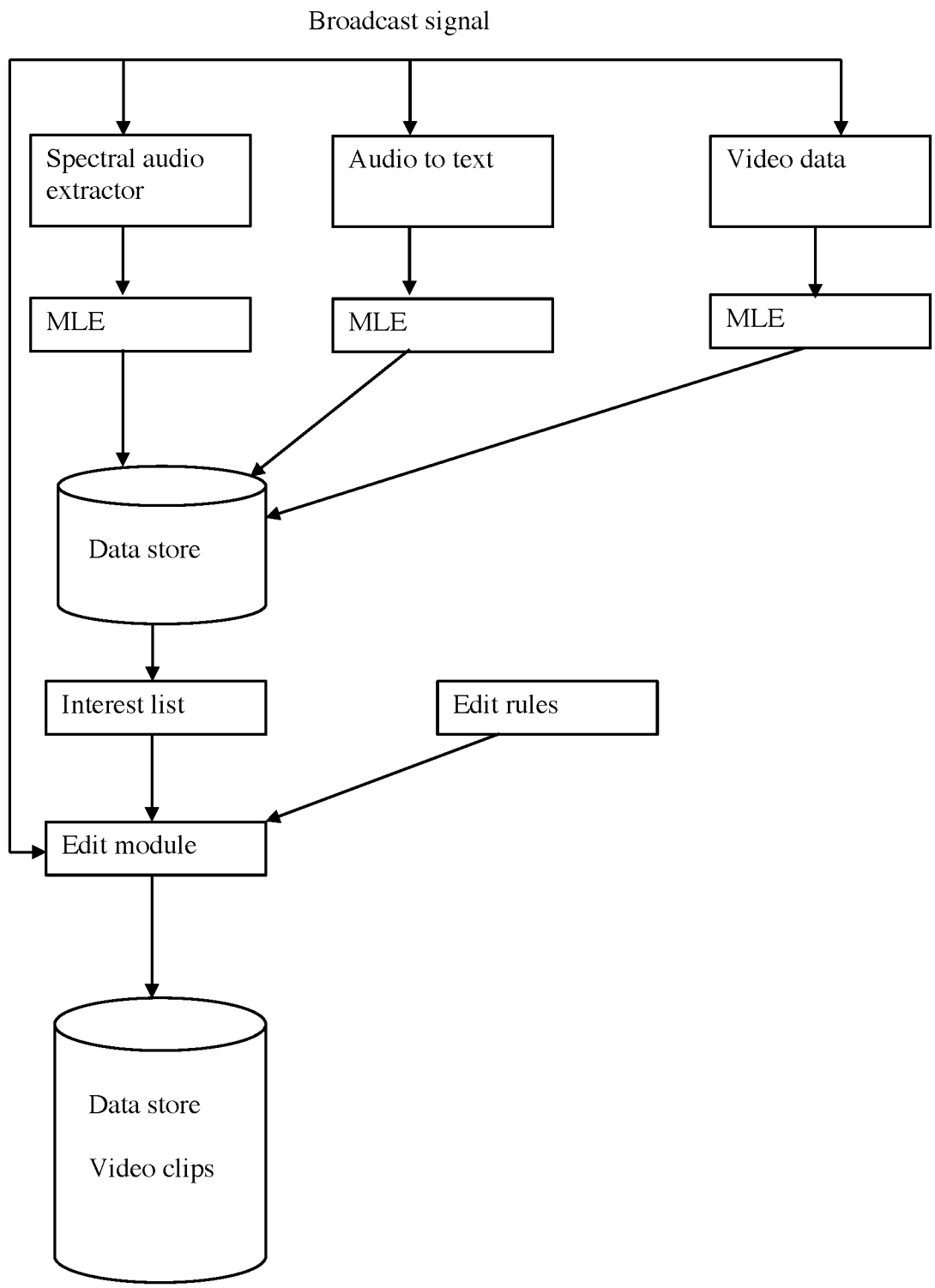
FIG. 4: An exemplary diagram of the system that embodies the claimed invention.

Audio streams (example: Podcasts) ability to analyze short and long form audio to pinpoint reels that based on the application analysis would show emotive areas of interest, defined areas of interest based on speech and identified words of interest based on real-time keyword flagging to allow media companies to engage with audio streams in new ways by defining the most interesting areas of focus to replay. FIG. 4.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML, document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system for determining periods of time in an audio-visual signal encoding an event comprising:
   receiving a data representing the audio-visual signal said signal comprised of data representing an audience attending said event;
   extracting from the received audio-visual data at least one parameter data corresponding to an at least one time-slice within the audio-visual signal, said at least one parameter data representing a magnitude of heightened emotional state of the audience attending the event that is the subject of the of the audio-visual signal within the corresponding an at least one time slice;
   storing in a data structure the at least one parameter data and an at least one time slice value corresponding to the at least one parameter;
   determining an at least one time values of heightened interest by calculating a correlation between the extracted at least one parameter data representing a magnitude of heightened emotional state of the audience attending the event that is the subject of the of the audio-visual signal within the corresponding an at least one time slice and an at least one pre-determined parameter data values associated with a heightened audience interest level; and
   storing the determined at least one time values in a data structure associated with the received audio-visual signal.

2. The method of claim 1 where the extracting step is comprised of:
   extracting an audio portion of the audio-visual data stream; and
   generating from the extracted audio an at least one parameters representing an at least one spectral vectors, each spectral vector corresponding to the at least one time slice.

3. The method of claim 2 where the determining step is comprised of:
   for each time slice, automatically determining if the spectral vector of that time slice is part of a spectral pattern that is correlated with heightened audience interest; and
   in dependence on the automatic determination whether the spectral vector is part of said spectral pattern, storing in a data structure at least one data values representing at least one time value corresponding to the determined spectral pattern.

4. The method of claim 1 where the extracting step is comprised of:
   extracting an audio portion of the audio-visual data stream;
   detecting in the extracted audio portion an at least one word text data item, said word text data item having a corresponding at least one time slice value; and
   determining if the at least one word text data item is an element in a pre-determined word set correlated with heightened audience emotion or audience interest.

5. The method of claim 1 where the extracting step is comprised of:
   receiving a data file comprised of text data representing at least one word spoken during the audio-visual data; and determining if the at least one word text data item is an element in a pre-determined word set correlated with heightened audience emotion or audience interest.

6. The method of claim 5 where the data file comprised of text data is further comprised of time data values that indicate an at least one time values during the audio visual data corresponding to where the at least one words were spoken.

7. The method of claim 1 further comprising:
extracting an audio data portion of the audio-visual data stream;
automatically detecting an at least one sound level in a corresponding at least one time slice of the audio data portion; and
automatically detecting whether the at least one detected sound levels represent a pattern of sound levels correlate with a sound level pattern representing a higher emotive state of the audience.

8. The method of claim 1 further comprising:
extracting a video data portion of the audio-visual data stream;
automatically detecting at least one video data characteristics correlated with a heightened interest by the audience;
determining an at least one time slice value corresponding to the at least one detected video characteristics; and
storing in the data structure the at least one determined time slice values.

9. The method of claim 8 where the video data characteristics are comprised of one or both of variances in colour or luminosity.

10. The method of claim 8 further comprising:
extracting from the video data portion data representing at least one facial expression; and
determining whether the at least one extracted facial expression data is correlated with a pre-determined facial expression data correlated with heightened emotional interest by an audience member.

11. The method of claim 1 where the storing step is comprised of:
automatically generating and storing a data structure comprised of data that lists an at least one start and a corresponding at least one a stop time of a corresponding at least one period of time during the audio-visual signal determined to be correlated with a heightened audience interest level.

12. The method of claim 1 further comprising:
receiving at least one data representing a physiological response by an at least one viewer of the audio-visual signal; and
storing an at least one data value representing the physiological response of the at least one viewer in a data structure that defines a correspondence between the at least one physiological data value and the at least one time slice.

13. The method of claim 1 where the extracting step is comprised of:
determining an at least two time interval data comprised of a corresponding at least one start time slice value and a corresponding at least one stop time slice value where substantially the same video data during each of the at least two time intervals during the audio visual signal is repeated.

14. The method of claim 1 where the extracting step is comprised of extracting at least one parameter data representing an at least one audio sound level, and the storing step is comprised of storing at least one text data value corresponding to the at least one time slice and the calculating a correlation step is further comprised of using the text data in combination with the audio sound level data to determine the at least one time values of heightened audience interest.

15. The method of claim 13 where the storing step is comprised of storing at least one text data value corresponding to the at least one time slice and the calculating a correlation step is further comprised of using the text data in combination with the at least two video time interval data to determine the at least one time values of heightened audience interest.

16. The method of claim 1 where the at least one parameter data represents one of a colour or a luminosity variance.

17. The method of claim 1 where the at least one parameter data represents a facial expression characteristic.

18. The method of claim 1 where the determining step is comprised of determining an at least one time values of heightened audience interest by calculating a correlation among data variables representing at least one of: (i) an at least one audio spectral vector, (ii) an at least one audio sound level, (iii) an at least one colour, (iv) an at least one luminosity variance, (v) an at least one facial expression characteristic, (v) an at least one word data or (vi) at least one physiologic response.

19. The method of claim 18 where the determining step is comprised of calculating a matching score for one or more of the calculated correlations with the at least one predetermined audio spectral pattern, predetermined sound level pattern, predetermined colour or luminosity variance, predetermined facial characteristic and predetermined word set.

20. The method of claim 18 where the determining step is comprised of inputting the data variables into a machine learning engine and using an output of the machine learning engine for the calculating a correlation step.

21. The method of claim 20 where the machine learning engine is a neural network.

22. The method of claim 20 where the machine learning engine calculates a correlation matching score.

23. The method of claim 18 further comprising:
using a video portion of the audio-visual data to detect an at least one time slices where the video portion has repeated an at least one earlier video portion of the audio-visual data by detecting an at least one self-similar region in the visual component of the audio-visual data.

24. The method of claim 11 further comprising:
receiving the data structure comprised of at least one start and stop times; and
generating an edited version of the audio-visual data by using the received data structure to select corresponding portions of the audio-visual data.

25. The method of claim 24 where the generating step is further comprised of:
applying at least one mapping rule to an at least one time value in the data structure to specify an at least one edit point.

26. The method of claim 21 where the mapping rule is one of: setting the edit point to be at least one of: the time of a detected change in luminosity or colour that was detected just prior to the time value, or a predetermined pre-roll time before prior to the time value.

27. The method of claim 1 where the determining step is comprised of determining a logical condition where at substantially the same time slice values, either the audio spectral vectors or the audio sound levels are correlated with heightened audience interest and the word data are correlated with heightened audience interest.

28. A method executed by a computer system for determining in an audio-visual signal encoding an event that is comprised of data representing an audience attending the event, periods of time that have heightened audience interest level, comprising:
- receiving a data representing the audio-visual signal;
- extracting from the received audio-visual data at least one parameter data corresponding to an at least one time-slice within the audio-visual signal, said at least one parameter data representing a magnitude of a sound level within a predetermined audio spectral range of the audio-visual signal within the corresponding an at least one time slice;
- receiving data representing an at least one word text data item representing at least one word spoken during the audio-visual data said at least one word text data item having a corresponding at least one time slice value;
- storing in a data structure the at least one parameter data and an at least one time slice value corresponding to the at least one parameter;
- storing in the data structure the at least one word text data item and corresponding at least one time slice value;
- determining an at least one time values of heightened audience interest by calculating a correlation between the extracted at least one parameter data representing a magnitude of a sound level within a predetermined audio spectral range of the audio-visual signal within the corresponding an at least one time slice, the stored at least one word text data items and an at least one pre-determined parameter data values and an at least one pre-determined text data items associated with a heightened audience interest level; and
- storing the determined at least one time values in a data structure associated with the audio-visual signal.

29. The method of claim 28 where the determining step is comprised of calculating a matching score for one or more of the calculated correlations with the at least one predetermined audio spectral pattern, predetermined sound level pattern, predetermined colour or luminosity variance, predetermined facial characteristic and predetermined word set.

30. The method of claim 28 where the determining step is comprised of inputting the data variables into a machine learning engine and using an output of the machine learning engine for the calculating a correlation step.

31. The method of claim 30 where the machine learning engine is a neural network.

32. The method of claim 30 where the machine learning engine calculates a correlation matching score.

33. The method of claim 28 further comprising:
- using a video portion of the audio-visual data to detect an at least one time slices where the video portion has repeated an at least one earlier video portion of the audio visual data by detecting an at least one self-similar region in the visual component of the audio-visual data.

34. The method of claim 28 further comprising:
- automatically generating and storing a data structure comprised of data that lists an at least one start and a corresponding at least one a stop time of a corresponding at least one period of time during the audio-visual signal determined to be correlated with a heightened audience interest level; and
- generating an edited version of the audio-visual data by using the stored data structure comprised of data that lists an at least one start and a corresponding at least one a stop time to select an at least one corresponding portions of the audio-visual data.

35. The method of claim 34 where the generating step is further comprised of:
- applying at least one mapping rule to an at least one time value in the data structure to specify an at least one edit point.

36. The method of claim 35 where the mapping rule is one of: setting the edit point to be the time of the scene transition that was detected just prior to the time value, setting the edit point to be a predetermined pre-roll time before prior to the time value.

* * * * *